United States Patent
Chen et al.

(10) Patent No.: US 10,448,361 B2
(45) Date of Patent: Oct. 15, 2019

(54) PAGING AND RANDOM ACCESS RESPONSE (RAR) SCHEDULING AND DCI FORMAT

(71) Applicant: MEDIATEK Singapore Pte. Ltd., Singapore (SG)

(72) Inventors: Hua-Min Chen, Beijing (CN); Tao Chen, Beijing (CN)

(73) Assignee: HFI Innovation INC., Hsin-Chu (TW)

( * ) Notice: Subject to any disclaimer, the term of this patent is extended or adjusted under 35 U.S.C. 154(b) by 0 days.

(21) Appl. No.: 15/871,983

(22) Filed: Jan. 16, 2018

(65) Prior Publication Data
US 2018/0139720 A1    May 17, 2018

Related U.S. Application Data

(63) Continuation of application No. PCT/CN2015/087006, filed on Aug. 14, 2015.

(51) Int. Cl.
*H04W 68/02* (2009.01)
*H04W 4/70* (2018.01)
(Continued)

(52) U.S. Cl.
CPC ........... *H04W 68/025* (2013.01); *H04W 4/70* (2018.02); *H04W 72/048* (2013.01);
(Continued)

(58) Field of Classification Search
CPC . H04W 68/025; H04W 72/1289; H04W 4/70; H04W 72/048; H04W 72/14; H04W 74/0833; H04W 72/005
See application file for complete search history.

(56) References Cited

U.S. PATENT DOCUMENTS

| | | | |
|---|---|---|---|
| 2005/0153714 A1* | 7/2005 | Subrahmanya | H04W 68/00 455/458 |
| 2012/0149403 A1* | 6/2012 | Subrahmanya | H04W 68/00 455/458 |

(Continued)

FOREIGN PATENT DOCUMENTS

| | | |
|---|---|---|
| CN | 103209481 A | 9/2009 |
| CN | 104349476 A | 8/2013 |

(Continued)

OTHER PUBLICATIONS

International Search Report and Written Opinion of International Search Authority for PCT/CN2015/087006 dated May 19, 2016 (14 pages).

(Continued)

*Primary Examiner* — Brian D Nguyen
(74) *Attorney, Agent, or Firm* — Imperium Patent Works; Helen Mao

(57) ABSTRACT

Methods and apparatus are provided for paging and random access response (RAR) scheduling and downlink control information (DCI) for a user equipment (UE). In one novel aspect, an SI-paging and a call-paging are transmitted separately, and scheduled by SI-Paging-DCI and call-Paging-DCI respectively. In one embodiment, a special PO is introduced for stand-alone SI-Paging scheduled by SI-Paging-DCI, and the special PO is different from the PO for call-Paging. In another novel aspect, SI-Paging is scheduled together with call-paging in the same PDSCH scheduled by call-Paging-DCI. In one embodiment, the SI-paging carries a value tag and a bitmap, wherein the value tag indicates whether any SI updates, and the bitmap indicates which one or more SIs updates. In another embodiment, the SI-Paging carries several valuetags, and the number of valuetag cor- (Continued)

responds to the number of SI. The UE compares a current valuetag to a stored valuetag to verify whether a SI changes.

20 Claims, 12 Drawing Sheets

(51) Int. Cl.
H04W 72/04 (2009.01)
H04W 72/12 (2009.01)
H04W 72/14 (2009.01)
H04W 74/08 (2009.01)
H04W 72/00 (2009.01)

(52) U.S. Cl.
CPC ....... *H04W 72/1289* (2013.01); *H04W 72/14* (2013.01); *H04W 72/005* (2013.01); *H04W 74/0833* (2013.01)

(56) References Cited

U.S. PATENT DOCUMENTS

| | | | | |
|---|---|---|---|---|
| 2015/0117374 | A1 | 4/2015 | Wu | 370/329 |
| 2016/0044632 | A1* | 2/2016 | Liang | H04W 52/0216 455/426.1 |
| 2016/0100380 | A1* | 4/2016 | Jha | H04W 68/005 455/458 |
| 2016/0183295 | A1 | 6/2016 | Liu et al. | 370/330 |
| 2017/0171764 | A1* | 6/2017 | Dimou | H04W 4/70 |
| 2017/0359801 | A1 | 12/2017 | Chen et al. | |
| 2018/0069652 | A1* | 3/2018 | Yamamoto | H04L 5/0051 |
| 2018/0109286 | A1* | 4/2018 | Yao | H04B 1/7143 |

FOREIGN PATENT DOCUMENTS

| | | |
|---|---|---|
| CN | 104602359 A | 10/2013 |
| WO | WO2015012654 A1 | 7/2013 |
| WO | WO2016168973 A1 | 4/2015 |

OTHER PUBLICATIONS

EPO, search report for the EP application 15901229.3 dated Feb. 25, 2019 (13 pages).
R2-152119 3GPP TSG-RAN WG2 Meeting #90, Panasonic, "MTC SI Change Indication", Fukuoka, Japan, May 25-29, 2015 (2 pages).
R2-152557 3GPP TSG RAN WG2 Meeting #90, NEC, "Paging transmission to REl-13 MTC UEs", Fukuoka, Japan, May 25-29, 2015 (5 pages). * paragraph [02.1] *.
R2-152191 3GPP TSG-RAN WG2 #90, NTT COCOMO, Inc., "Paging for BW reduced low Complexity UEs", Fukuoka, Japan, May 25-29, 2015 (6 pages).
R2-141304 3GPP TSG-RAN WG2 #85bis, Ericsson, "Paging mechanism for low cost UEs", Valencia, Spain, Mar. 31-Apr. 4, 2014 (4 pages). * paragraph [02.5] *.
EPO, search report for the EP application 15901229.3 dated Jun. 11, 2019 (14 pages).
R2-085587 3GPP TSG-RAN WG2 #63bis, Qualcomm Europe, "Granularity of information at SIB modification", Prague, Czech Republic, Sep. 29-Oct. 3, 2008 (24 pages). *paragraph [0002]*, *paragraph [02.3]*, *paragraph [5.2.2.4]*.

* cited by examiner

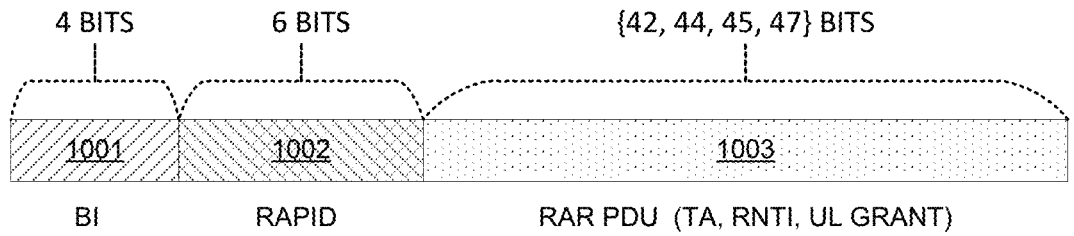
FIG. 10
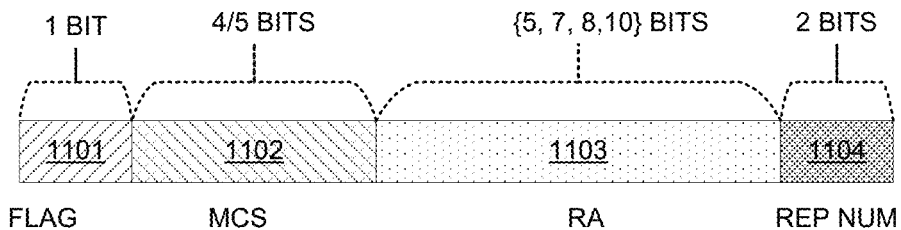
FIG. 11A
| Flag value | Scenario | DCI format |
|---|---|---|
| 0 | wo RAR | • Flag + BI, no PDSCH (DCI bit padding) |
| 1 | wi RAR (BI is within PDSCH) | • normal mode<br>   Flag + MCS + RA<br>• CE mode<br>   Flag + MCS + RA + Rep |
FIG. 11B

PAGING AND RANDOM ACCESS RESPONSE (RAR) SCHEDULING AND DCI FORMAT

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2015/087006, with an international filing date of Aug. 14, 2015. This application is a continuation of International Application No. PCT/CN2015/087006, which is pending as of the filing date of this application, and the United States is a designated state in International Application No. PCT/CN2015/087006. The disclosure of each of the foregoing documents is incorporated herein by reference.

TECHNICAL FIELD

The disclosed embodiments relate generally to wireless communication, and, more particularly, to paging and random access response (RAR) scheduling and downlink control information (DCI).

BACKGROUND

Third generation partnership project (3GPP) and Long Term Evolution (LTE) mobile telecommunication systems provide high data rate, lower latency and improved system performances. Such systems are optimized for regular data communications, wherein there is no need for repeatedly retransmissions. However, in some situations, repeatedly retransmissions are needed. For example, some UEs, in the basements of residential buildings or locations shielded by foil-backed insulation, metalized windows or traditional thick-walled building construction, may experience significantly larger penetration losses on the radio interface than normal LTE devices. More resources/power are needed to support these UEs in the extreme coverage scenario. Repetition has been identified as a common technique to bridge the additional penetration losses than normal LTE devices. In another example, Machine-Type Communication (MTC) is an important revenue stream for operators and has a huge potential from the operator perspective. Lowering the cost of MTC user equipment (UEs)/devices is an important enabler for the implementation of the concept of "Internet of Things" (IOT). The LC-MTC/LC-UE has limited bandwidth. The limited bandwidth and the need to repeatedly transmission require enhancement for paging and RAR procedures.

Improvements and enhancements are needed for paging and RAR scheduling for LC-UEs.

SUMMARY

Methods and apparatus are provided for paging and RAR scheduling, and corresponding DCI format for low cost UEs. In one novel aspect, an SI-paging (system information-paging) and a call-paging are transmitted separately, and scheduled by SI-Paging-DCI and call-Paging-DCI respectively. In one embodiment, a special PO is introduced for stand-alone SI-Paging scheduled by SI-Paging-DCI, and the special PO is different from the PO for call-Paging. In another novel aspect, SI-Paging is scheduled together with call-paging in the same PDSCH scheduled by call-Paging-DCI. In one embodiment, the SI-paging carries a value tag and a bitmap, wherein the value tag indicates whether any SI updates, and the bitmap indicates which one or more SIs updates. In another embodiment, the SI-Paging carries several valuetags, and the number of valuetag corresponds to the number of SI. The UE compares a current valuetag to a stored valuetag to verify whether a SI changes.

In another novel aspect, the RAR scheduling and RAR-DCI format is based on a CE level of the UE. In one embodiment, based on DL measurement, the UE determines a coverage enhancement (CE) level and select a preamble for this CE level in a wireless communication network and determines whether a RAR mode is a single RAR for a single UE or a multiple RAR for a plurality of UE. The UE decodes the RAR based on the CE level of the UE and the RAR mode. In one embodiment, the RAR-DCI has the same size for both coverage enhanced or coverage extension (CE) mode, and normal coverage (NC)mode. In another embodiment, the transmit power control (TPC) command field is overloaded with a repetition number if the CE level indicates a coverage enhanced/extension(CE) mode, wherein the repetition number indicates a number of repetitions for the CE level.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 10 illustrates an exemplary diagram of the DCI for the single RAR in accordance with embodiments of the current invention.

FIG. 11A illustrates an exemplary diagram of the DCI for the multiple RARs in accordance with embodiments of the current invention.

FIG. 11B illustrates a comparison table for different scenarios for a multiple RAR DCI in accordance with embodiments of the current invention.

DETAILED DESCRIPTION

Reference will now be made in detail to some embodiments of the invention, examples of which are illustrated in the accompanying drawings.

Figure 1:
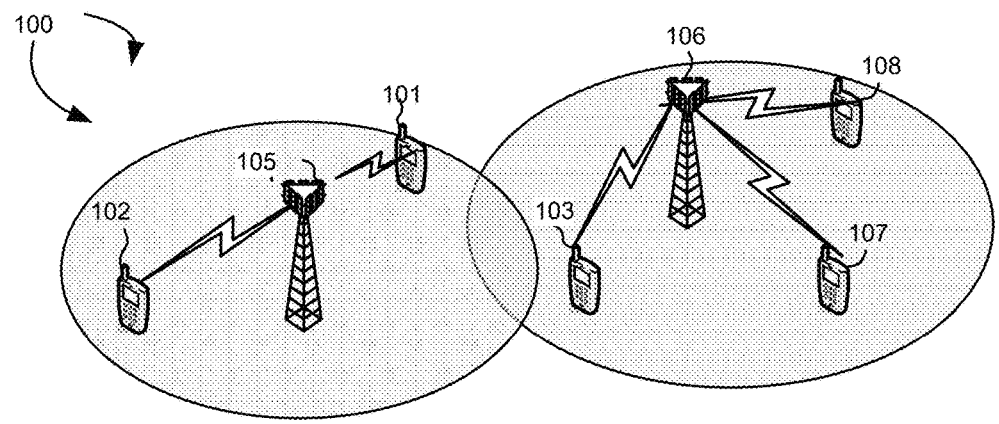
FIG. 1 illustrates an exemplary wireless network 100 with enhanced paging and RAR scheduling for LC-UEs in accordance with embodiments of the current invention.
Figure 1:
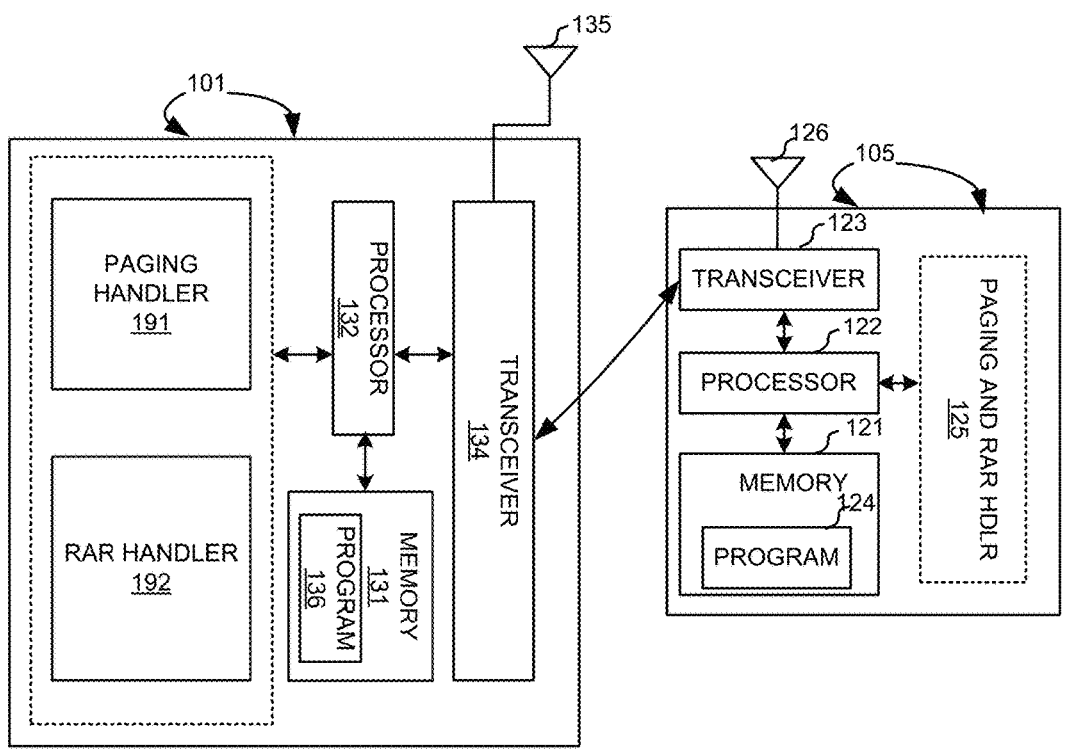

Currently, the traditional paging scheduling and RAR scheduling are not designed for repeatedly transmissions, wherein paging is to indicate system information (SI) modification and to page idle UE to set up RRC connection, and RAR is a response from eNB for UE transmitted preamble. For example, LC-UE does not support PDCCH, instead, MTC PDCCH (M-PDCCH) is used. Further, UEs still have to blind decode all system information to confirm which system information have modifies, after receiving a paging message for SI update notification. It will introduce much power consumption for LC MTC UEs, which are expected to have a 10-year battery life. To facilitate description, the information within a paging message to indicated system information modification is named as SI-paging, and the information within a paging message to initiate RRC connection setup is named as Call-paging FIG. 1 illustrates an exemplary wireless network 100 with enhanced paging and RAR scheduling for LC-UEs in accordance with embodiments of the current invention. Wireless communications system 100 includes one or more wireless networks, and each of the wireless communication network has fixed base infrastructure units, such as 105 and 106. The base units may also be referred to as an access point, an access terminal, a base station, eNB, or by other terminology used in the art. Each of the base stations 105 and 106 serves a geographic area. The geographic area served by wireless communications stations 105 and 106 overlaps in this example.

UEs 101 and 102 in the wireless network 100 are served by base station 105. Other UEs, such as UEs 103, 107 and 108, are served by a different base station 106.

In one novel aspect, UEs 101, 102, 103, 107 and 108 can be LC-UEs, and the LC-UEs can have different coverage enhancement (CE) level to support coverage extension. In one embodiment, LC-UEs 101, 102, 103, 107 and 108 are real LC-MTC UEs actually. In another embodiment, LC-MTC UEs 101, 102, 103, 107 and 108 are regular UEs that are served/regarded as LC UEs. For example, regular UEs in CE mode can be served as LC UEs.

To page a group of UEs with less resource overhead and less power consumption, a single paging message is multi-casted to the group of UEs identified by a group ID in one embodiment. That is there is only one ID to page the group of UEs. In another embodiment, the single paging message for multiple UEs is a function of a group-specific P-RTNI. In this embodiment, the single paging message can be a sequence generated from the P-RNTI, and corresponding UEs determine they are paged if such sequence exists. The group-specific P-RNTI is higher layer configured by broadcast in one design option. For such single paging message without carrying multiple UE specific IDs, the grouping can be (re)configured. In one embodiment, UEs with similar CE levels are grouped together. In another embodiment, UEs with same service/traffic type within a specific area is grouped and identified by a group ID. Then, the group UEs in one single paging message can of the same CE level or different CE level. If the CE level is similar, a repetition number for retransmission is determined based on the common CE level for the paging group in one option. In another option, the paging has a mixed level of CE value. The repetition number is, thereby, the one corresponding to the highest CE level in the paging group.

FIG. 1 further shows simplified block diagrams of UE 101 and base station 105 in accordance with the current invention.

Base station 105 has an antenna array 126 comprising one or more antennas, which transmits and receives radio signals. A RF transceiver module 123, coupled with the antenna, receives RF signals from antenna array 126, converts them to baseband signals and sends them to processor 122. RF transceiver 123 also converts received baseband signals from processor 122, converts them to RF signals, and sends out to antenna array 126. Processor 122 processes the received baseband signals and invokes different functional modules to perform features in base station 105. Memory 121 stores program instructions and data 124 to control the operations of base station 102. Base station 105 also includes a set of control modules, such as a paging and RAR handler 125 that carry out functional tasks to configure, schedule, execute and communicate with the UE 101 for paging and RAR related tasks.

UE 101 has an antenna array 135 with single antenna, which transmits and receives radio signals. A RF transceiver module 134, coupled with the antenna, receives RF signals from antenna array 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

UE 101 also includes a set of control modules that carry out functional tasks. A paging handler 191 handles paging monitoring for both SI-paging and Call-paging. A RAR handler 192 handles RAR procedure based on the CE level for both the single RAR and multiple RAR.

In one novel aspect, a paging message is multi-casted to a plurality of UEs. The group of UEs can be paged by one same group ID with a very small payload size. The power consumption and resource efficiency are improved, especially for LC-UEs with repeatedly transmissions.

Figure 2:
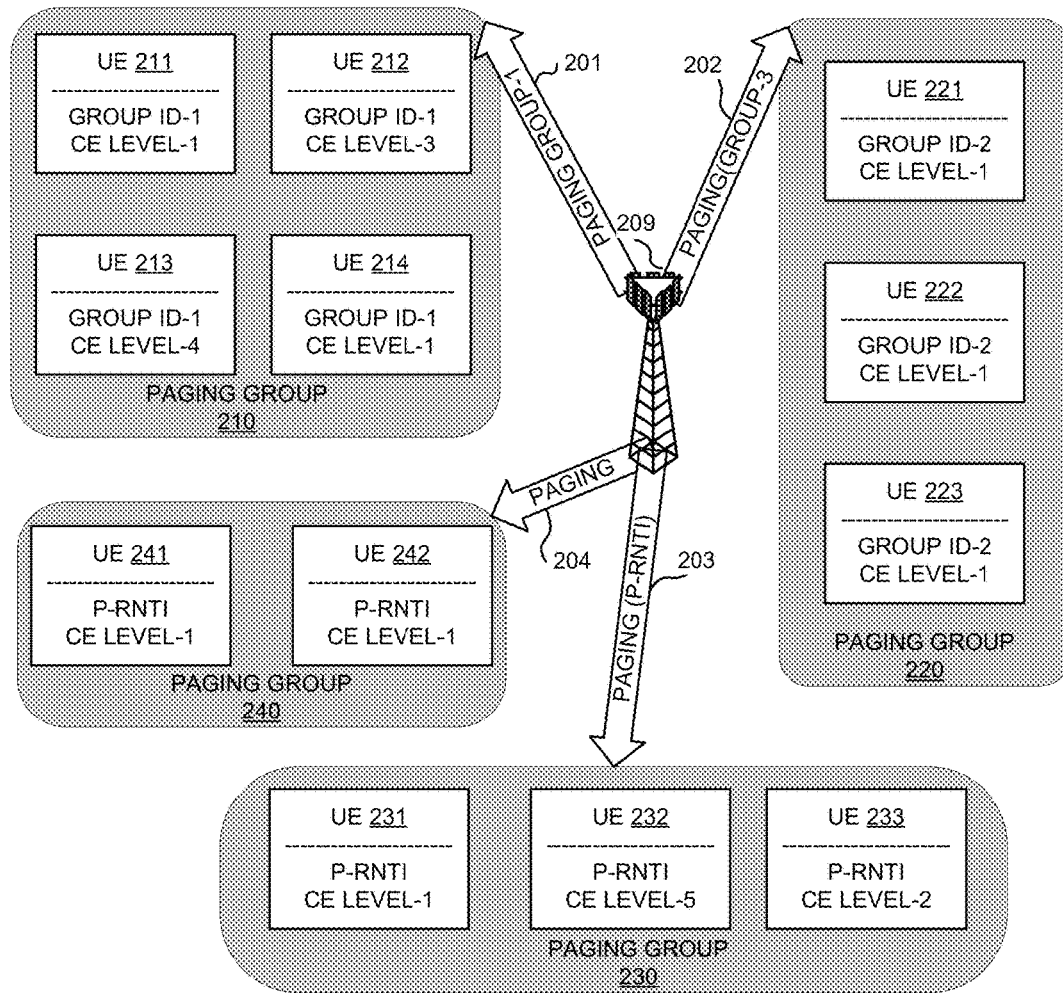
FIG. 2 illustrates exemplary paging groups to page a group of UEs by the same paging message in accordance with embodiments of the current invention.

FIG. 2 illustrates exemplary paging groups to page different group of UEs by the same single paging message in accordance with embodiments of the current invention. A base station 209 covers a plurality of UEs with different CE levels. FIG. 2 shows four exemplary diagrams of different grouping for the paging message according to different rules.

In one embodiment, UEs with the same service type but different CE levels are grouped together, and configured by a same group ID. As shown, paging group 210 includes four UEs, UE 211, UE 212, UE 213, and UE 214 with CE levels being CE level-1, CE level-3, CE level-4 and CE level-1, respectively. All the UEs in the same paging group have the same group ID-1. A paging message 201 is multi-casted with the group ID-1. The one paging message 201 covers the four UEs in the same paging group 210. In one embodiment, repeatedly transmissions are required for UE in CE mode. In one option, the number of repetition is based on the higher CE level. In this example, each UE in group-1, UEs 211, 212, 213 and 214, receives repetition transmission with a repetition number corresponding to a CE level-4, which is the highest CE level in group-1. Such grouping can preconfigured by the network or by higher layer signaling.

In another embodiment, the UEs with the same CE-level are grouped together. A paging group 220, including UE 221, 222, and 223 are grouped together with the same paging group ID-2. Each UE in paging group 220 has the same CE level, i.e., CE level-1. A paging message 202 is multi-casted to all UEs in paging group 220 with the same repetition number based the common CE level (CE level-1).

In other embodiments, a group-specific P-RNTI is used to identify a paging group. A paging group 230 includes UEs 231, 232, and 233, with CE level-1, CE level-5 and CE level-2, respectively. A paging message 203 is multi-casted to each UE in paging group 230 with a group-specific P-RNTI, P-RNTI-1. The repetition number is set to be corresponding to the highest CE level of the group, which is CE level-5. In yet another embodiment, the UEs with the same CE level are grouped together by another group-specific P-RNTI, P-RNTI-2. As shown, a paging group 240 includes UEs 241 and 242, each with the same CE level-2. A paging message 204 is multi-casted to each UE in paging group 240 with P-RNTI-1, wherein the repetition number is set to be correspondence to CE level-1, while a paging message 203 is transmitted to each UE within paging group 230 with P-RNTI-2, wherein the repetition number is set to be corresponding to CE level-5, the highest CE level within paging group 230.

To reduce UE power consumption, it's expected that SI-paging can indicate which system information (including M-MIB (MTC MIB) and M-SIB (MIC SIB) information for LC MTC UEs) will update. In one case, that SI-paging is always transmitted regardless whether there are SI changes in one embodiment. In another embodiment, SI-paging is transmitted only when there will be some update to some system information. In one novel aspect, the SI-paging comprises a bitmap and a value tag. The bitmap indicates which system information changes and the value tag indicates whether there is any M-SI (MTC-SI) updates. In this novel aspect, the length of the bitmap is equal to the number of M-SI messages for MTC UEs in one embodiment. Here, change of M-MIB is not indicated. In another embodiment, the length of the bitmap is equal to the number of SI message for MTC UEs plus 1 to indicate the update of both M-MIB and M-SI. The value range of value tag can be denoted as an integer with Y bits, while candidate value for Y is {4, 5}. In another novel aspect, the SI-Paging comprises several value tags and each value tag indicates whether corresponding system information will update. Here, the total value tag number is equal to the bitmap length in the on novel aspect, and the value range of each value tag equals to the value tag in the one novel aspect.

Figure 3A:
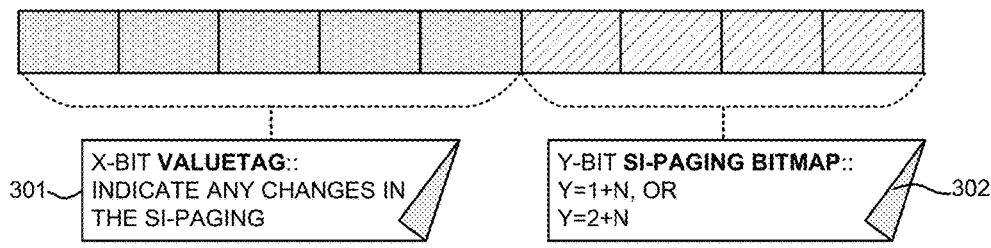
FIGS. 3A and 3B show exemplary diagrams of the SI value tag and bitmap for SI-paging message in accordance with embodiments of the current invention.

FIG. 3A shows an exemplary diagram of the SI value tag and bitmap for SI-paging message in accordance with embodiments of the current invention. In one embodiment, within SI-paging, there is an X-bit value tag 301 and Y-bit bitmap 302. In one embodiment, value tag 301 has five bits and indicates any changes to some system information. The UE compares the received value tag with the value tag it receives last time. If value tag 301 changes, it indicates there exists update to system information. The UE, subsequently, checks the Y-bit bitmap 302 to determine which M-SI or M-MIB will update. Bitmap 302 indicates one M-SI or M-MIB update by set the corresponding bit in bitmap 302, for example, to 1.

Figure 3B:
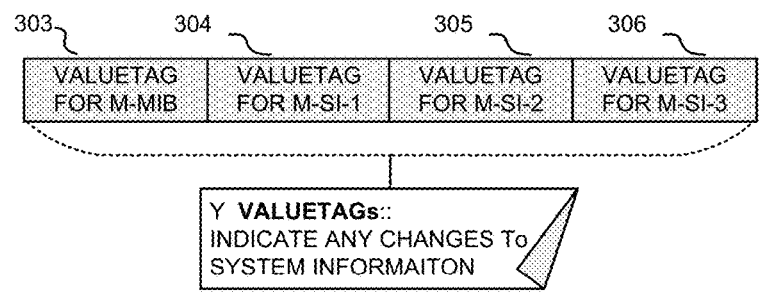

FIG. 3B shows an exemplary diagram of the SI value tag and bitmap for SI-paging message in accordance with embodiments of the current invention. In this figure, there are Y value tags {303, 304, 305, 306} within the SI-Paging. In this example, M-MIB change is indicated by a value tag 303 within SI-paging. Further, there are 3 M-SI messages for MTC UEs, and each M-SI change notification is denoted as value tag 304, 305, 306, respectively. If the value of any value tag changes, the UE can determine that the corresponding system information changes or will change.

For LC MTC UEs, the format of DCI for scheduling a paging message is different from legacy DCI format. One consideration is Resource Allocation (RA) field. Due to bandwidth reduction, resources are restricted to a limited size, e.g., 6 PRB pairs (1.4 MHz). Then, a RA filed should indicate which narrow band is used for paging message transmission, or how many resources are allocated within a narrow band. In a first embodiment, only a narrow band location for the paging message is indicated within the RA field, wherein it's assumed that all resources within the indicated narrow band are used for transmission. In a second embodiment, resources within a known narrow band are indicated by the RA field, wherein the known narrow band is (re)configured by higher layer, or predefined, or derived from a rule. In a third embodiment, the RA filed indicates a narrow band location and resource allocation within the indicated narrow band. The length of RA field depends on the whole channel bandwidth. Taking 20 MHz bandwidth as an example, the RA filed size can be 4 bits under the first embodiment, and 5 bits under the second embodiment considering 1.4 MHz limitation, and 9 bits in the third embodiment.

Further, the modulation order may be restricted for MTC UEs with payload size limitation and cost reduction. For example, 16 QAM can be supported in normal CE mode, and only QPSK is applied in the CE mode. Then, Modulation And Coding Scheme (MCS) field can be 4 bits or 5 bits. Also, the payload size can be larger if there are multiple UEs to be paged within one paging message. The payload size indicated by the MCS field is the exact size of the paging message. In another embodiment, the payload size for the paging message is the indicated payload size by the MCS field plus the payload size of SI-paging.

Thirdly, a field for repetition number indication is also needed in the CE mode. In one embodiment, a repetition number is explicitly given by the repetition number field. It can be interpreted as no coverage extension in case the indicated repetition number is 1. In another embodiment, an coefficient is given within the repetition number field, and the UE derives the exact repetition number by multiplexing the coefficient with a basic repetition number. Here, the basic repetition number is broadcast or predefined.

Then, a DCI format for LC MTC UEs to receive paging message may comprise modulation coding scheme (MCS) field, RA field, and repetition indication field at least. Considering blocking rate or in case of massive number of UE, one more field for dynamic extended PO allocation can be comprised to indicate an additional extended PO dynamically. For example, a value 1 for this single bit can be interpreted that there is an additional extended PO. To facilitate description, a current extended PO to receive/decode control information is named as a first extended PO, and the indicated additional extended PO from the decoded DCI at the first extended PO can be also named as a second extended PO. Then, if one UE finds it is not paged within current paging message, which is scheduled by the control information at the first extended PO, the UE can try to decode another DCI for paging message at the indicated second extended PO. In one embodiment, the additional PO indication always exist. Then, UE always blind decodes one DCI size, i.e. the Call-paging DCI size. In another embodiment, the additional extended PO indication is optional. Then, UEs should blind decode two different DCI sizes. The position of the indicated additional extended PO can be determined by adding a basic time distance predefined according to different CE levels to the determined first extended PO.

Figure 4:
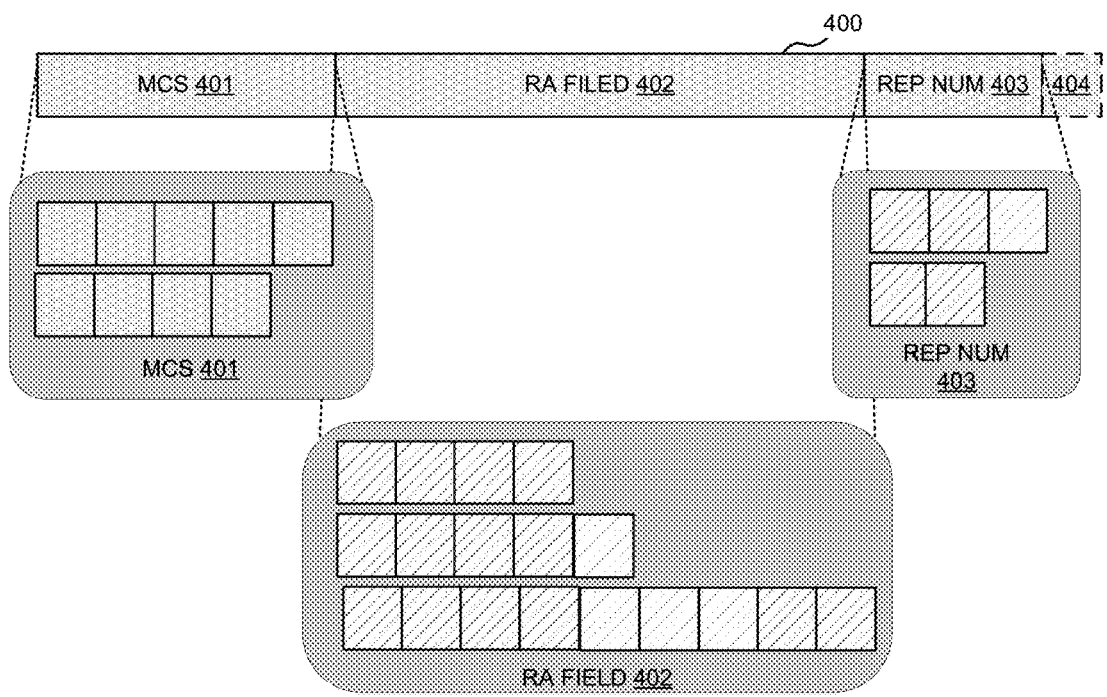
FIG. 4 shows exemplary diagrams of DCI format for call-paging in accordance with embodiments of the current invention.

FIG. 4 shows exemplary diagrams of DCI format to schedule paging message to LC MTC UEs in accordance with embodiments of the current invention. A paging DCI 400 includes a MCS field 401, a RA field 402, a repetition number field 403, and an additional extended PO field 404. MCS field 401 can be 4 bits or 5 bits depending on a UE number within a paging message and the CE level. In one embodiment, a 4-bit MCS field is for QPSK; while a 5-bit MCS field is for 16 QPSK. RA field 402 has 4 bits, 5 bits or 9 bits under different embodiments. Repetition number field 403 can be a 2-bit field or a 3-bit field. The 1-bit additional PO field 404 indicates whether there is another available extended PO for a paging message following current determined extended PO.

Figure 5:
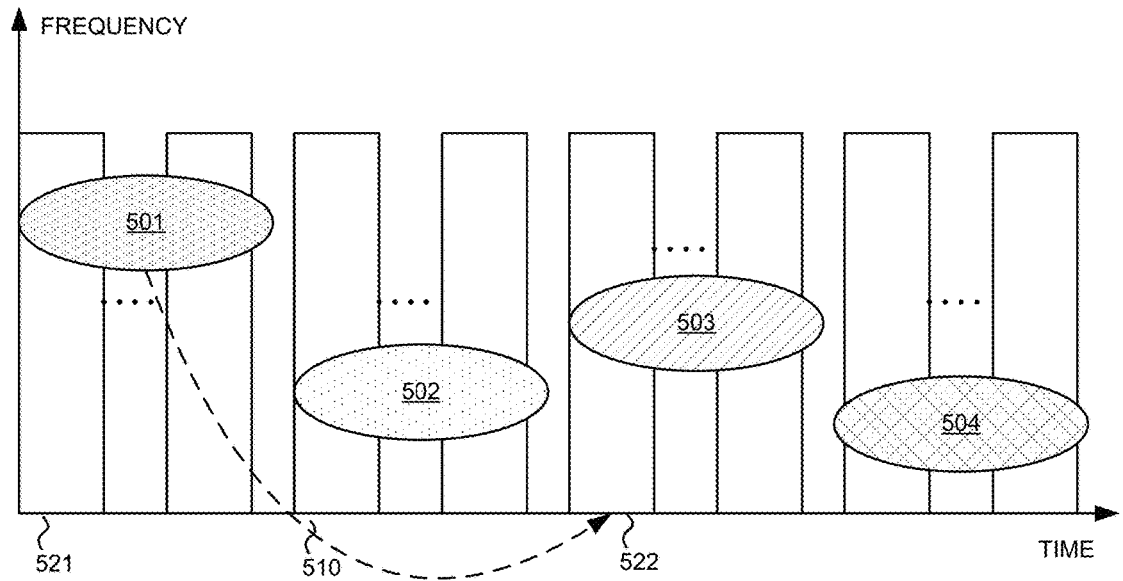
FIG. 5 shows an exemplary diagram for a paging procedure with additional Paging Occasion in accordance with the current invention.

FIG. 5 shows an exemplary diagram for a paging procedure with additional extended PO in accordance with the current invention. At step 501, the UE decodes a DCI for paging messages at an extended PO 521. The DCI in step 501 indicates one additional extended PO. At step 502, the UE receives a paging message according to the DCI decoded in step 501. At step 510, based on the additional extended PO indicated in step 501, the UE moves to decode another DCI at the additional extended PO 522 (step 503). At step 503, the UE decodes the second DCI for another paging monitoring. Based on the decoded DCI at step 503, the UE decodes another paging message at step 504.

In legacy system, paging occasion (PO) is a subframe carrying both the control information and the paging message. Considering the characteristics of LC MTC UEs, UEs may decode control information scheduling a paging message in one subframe, and receive the corresponding paging message in another subframe, since the control information and the paging message may locate in different narrow bands. Further, in case of CE mode with repetitions, UEs should also decode the control information first within multiple subframes, before decoding the corresponding paging message. Therefore, the UE should determine a starting point to decode control information when monitoring the paging message. In this invention, an extended PO is introduced for paging message monitoring for LC MTC UEs, wherein the extended PO is a starting point or a position in time domain to decode control information scheduling a paging message comprising SI-paging and Call-paging.

Call-paging is to initiate RRC connection, so it is only monitored by idle UEs without RRC connection. SI-paging is for all UEs to verify there is system information update. In this invention, connected UEs, i.e., UEs with RRC connection, determine to receive and decode corresponding system information, after receiving the SI-paging, in one embodiment. In another embodiment, updated information elements (IEs) within corresponding system information is transmitted to UEs specifically by network, and the received information will apply at next modification period. Note that not the whole of one or more M-SI messages are transmitted, but only the updated part of each M-SI message is transmitted.

In one embodiment, the SI-paging and the Call-paging are transmitted and received separately in different time positions. Specifically, the SI-paging is carried by a SI-paging DCI within MTC PDCCH (MPDCCH) transmitted at a dedicated extended PO for SI-paging (i.e., SI-paging-PO). The Call-paging is carried by the PDSCH scheduled by a Call-paging-DCI within MPDCCH which is transmitted from another extended PO for Call-paging (i.e., Call-paging-PO). In this novel aspect, the UE checks whether there is SI updates by detecting the SI-paging, when the UE is in the connected state. When the UE is the IDLE mode, the UE monitors Call-paging or SI-paging at each different extended PO.

In another embodiment, the SI-paging and the Call-paging are scheduled together at a same extended PO. Specifically, The SI-paging is transmitted by a SI-paging-DCIif no Call-paging is transmitted, and the SI-paging is carried by the PDSCH scheduled by the Call-paging-DCI, if there is call-paging transmission. In this novel aspect, when the UE is in the connected state, the updated IEs within corresponding system information message are transmitted to UE specifically by the eNB scheduling. When the UE is in the IDLE mode, the UE monitors both call-paging and SI-paging at each extended PO.

Figure 6:
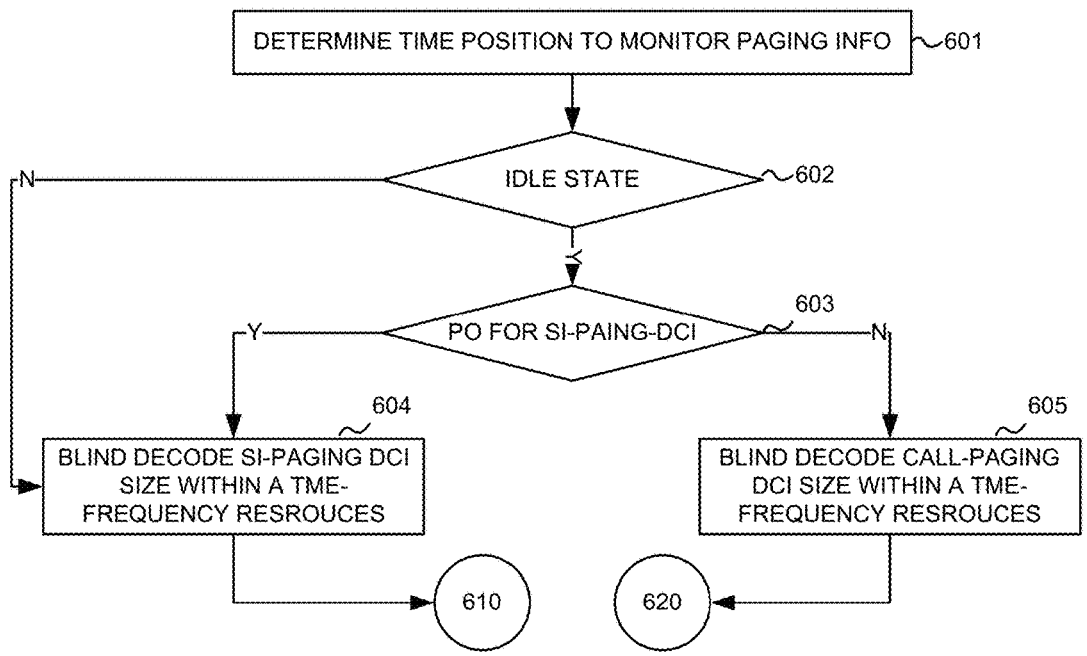
FIG. 6 shows an exemplary diagram for the first stage of procedure when the SI-paging and call-paging are sent separately in accordance with embodiments of the current invention.

FIG. 6 shows an exemplary diagram for the first stage of procedure when the SI-paging and call-paging are scheduled separately at different extended POs in accordance with embodiments of the current invention. At step 601, the UE determines a time position, e.g., an extended PO, to monitor the paging information. At step 602, the UE determines whether it is in the IDLE state. If step 602 determines no, the UE moves to step 604 and blindly decodes the SI-paging DCI with the SI-paging DCI size within time-frequency resources, since connected UE only monitors SI-paging. The UE subsequently continues to step 610 to deal with the SI-paging message. If step 602 determines yes, the UE moves step 603. At step 603, the UE determines if the determined extended PO is used for SI-paging. If the step 603 determines yes, the UE moves to step 604 and continues. If the step 603 determines no, i.e., the determined extended PO is used for Call-paging, which means the current extended PO is a Call-paging PO, the UE blindly decodes the DCI with Call-paging DCI size within a determined set of time-frequency resources to obtain a location for Call-paging (step 605). The UE subsequently continues to step 620 to deal with the Call-paging message.

Figure 7:
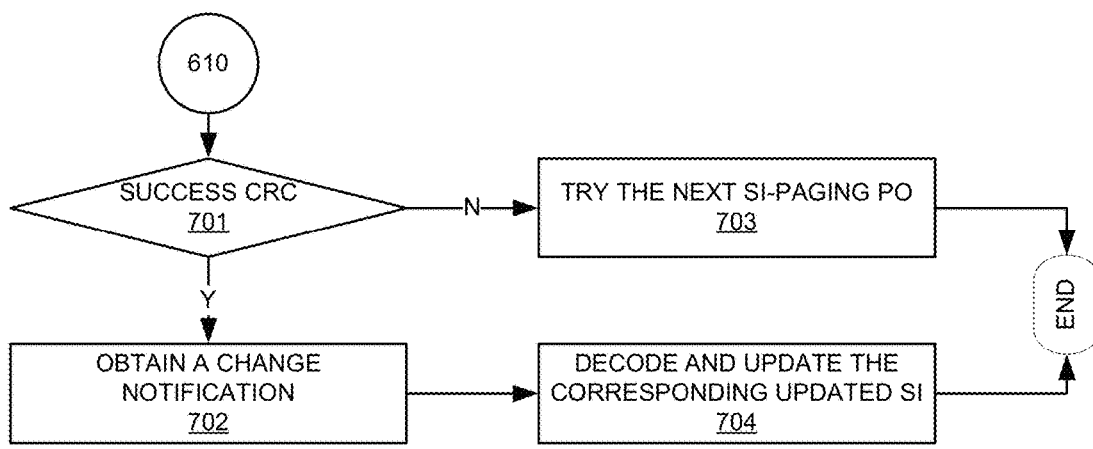
FIG. 7 shows an exemplary diagram for the second stage of SI-paging procedure when the SI-paging and call-paging are sent separately in accordance with embodiments of the current invention.

FIG. 7 shows an exemplary diagram for the second stage of SI-paging procedure when the SI-paging and Call-paging are scheduled separately at different extended POs in accordance with embodiments of the current invention. At step 701, followed by step 610 of blindly decoding SI-paging- DCI, the UE determines if the blind decoding is successful by checking the CRC. If step 701 determines no, the UE moves to step 703 and waits for the next SI-paging PO, wherein assuming SI-Paging is not transmitted at each possible SI-paging PO. If step 701 determines yes the UE moves step 702 and obtains change notification of system information. Based on step 702, the UE, at step 704, decodes and updates corresponding M-MIB or M-SI message at proper time positions.

Figure 8:
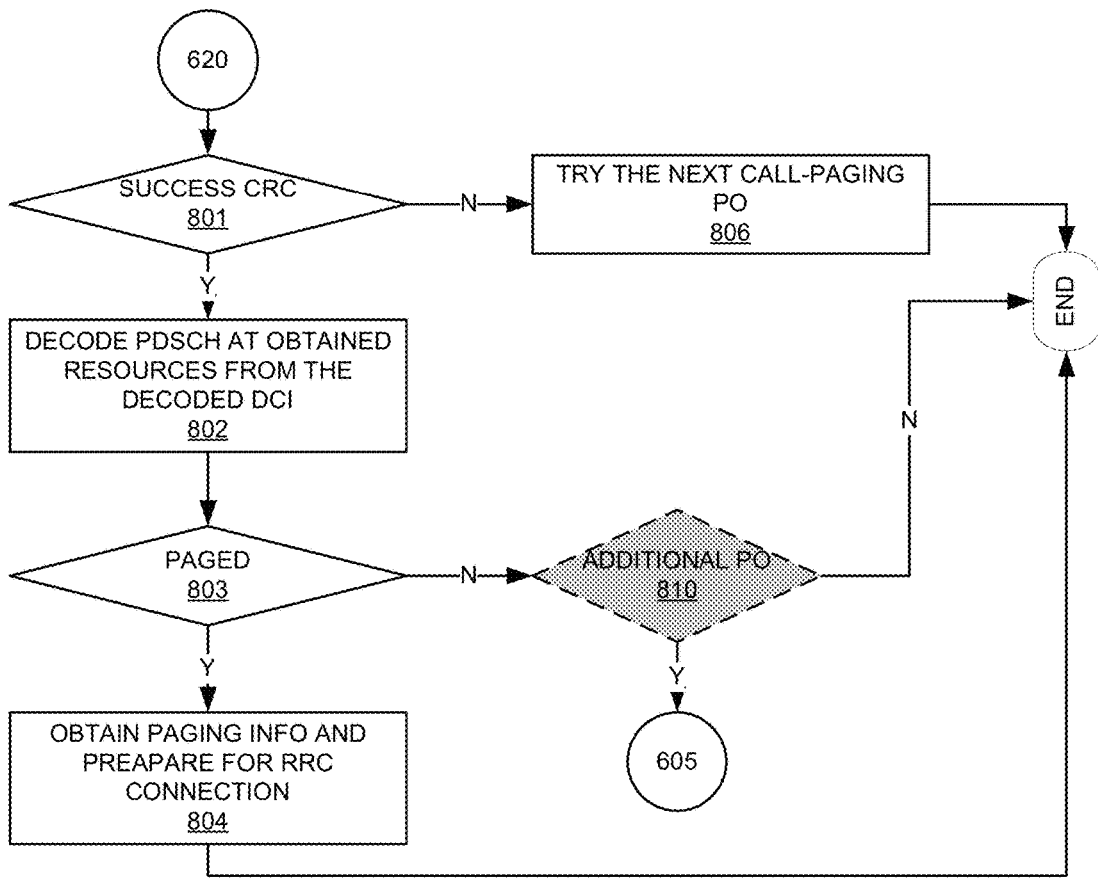
FIG. 8 shows an exemplary diagram for the second stage of call-paging procedure when the SI-paging and call-paging are sent separately in accordance with embodiments of the current invention.

FIG. 8 shows an exemplary diagram for the second stage of Call-paging procedure when the SI-paging and call-paging are scheduled separately in different extended POs in accordance with embodiments of the current invention. At step 801, followed by step 620 of blindly decoding the Call-paging-DCI, the UE determines if the decoding is successful by checking the CRC. If step 701 determines no, the UE moves to step 806 and waits to try the next Call-paging PO. If step 801 determines yes the UE moves to step 802. At step 802, the UE decodes the PDSCH according to the decoded DCI. The UE, subsequently, checks whether it has been paged in step 803. If step 803 determines yes, the UE moves to step 804, and obtains paging information and prepares for the RRC connection setup. If step 803 determines no, there are two options for the next step. In the first option, there is no additional extended PO for the UE, the UE will stop the paging process and moves to wait for the next extended PO. In the second option, the UE moves to step 810 and checks if there is additional extended PO indicated by the decoded Call-paging-DCI. If step 810 determines no, the UE will stop the paging process and moves to wait for the next extended PO. If step 810 determines yes, the UE will go back to step 605 to blindly decode for the Call-paging-DCI at the additional extended PO.

Figure 9:
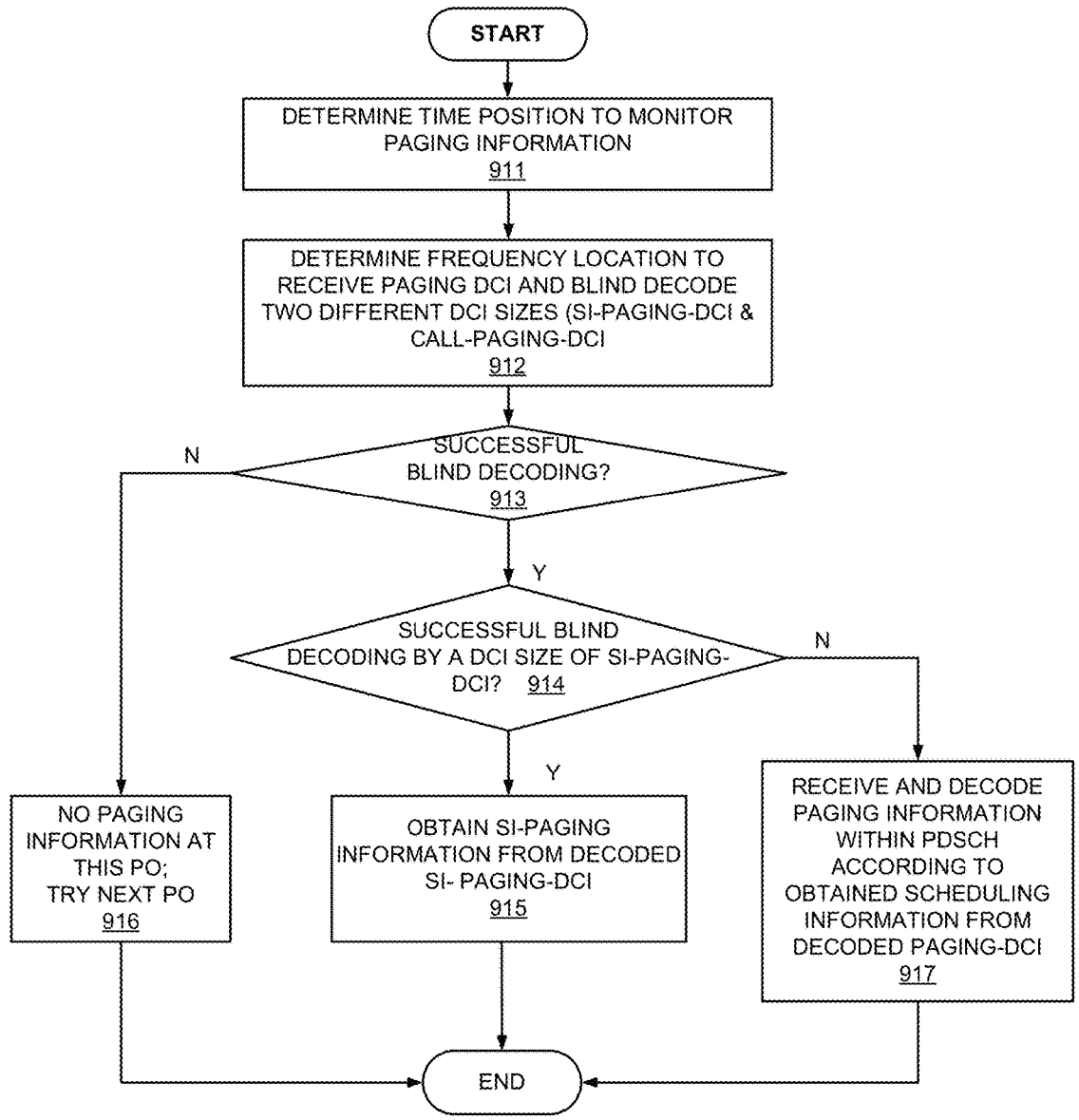
FIG. 9 shows an exemplary flow chart when the SI-paging and call-paging are sent together in accordance with embodiments of the current invention.

FIG. 9 shows an exemplary flow chart when the SI-paging and call-paging are scheduled together at a same extended PO in accordance with embodiments of the current invention. First in step 911, the UE determines a time position, i.e. PO to monitor paging information. Then in step 912, the UE determines the frequency location to receive Paging DCI and blind decode two different DCI sizes (SI-Paging-DCI and Call-Paging-DCI). Then in step 913 the UE determines if the blind decoding is successful. If yes in step 913, the UE goes go step 914 to determine whether the blind decoding successful with the SI-paging-DCI size or the call-paging DCi size. If successful with the SI-paging-DCI size, the UE goes to step 915 to obtain SI-Paging information from decoded SI-Paging-DCI. If successful with the Call-paging-DCI size, the UE goes to step 917 to receive and decode paging information within PDSCH according to obtained scheduling information from decoded Paging-DCI. Here, the paging information comprises both SI-paging and Call-paging. If the blind decoding in step 913 is not successful, the UE goes to step 916 to determine as no Paging information at this PO and try the next extended PO.

In another novel aspect, RAR message transmission and content of RAR message are also modified for LC MTC UEs. For LC-MTC UEs, RAR message is scheduled by RAR-DCI transmitted within MPDCCH. The transmission of RAR-DCI and RAR message, such as resources and repetition level, depends on the PRACH, wherein the PRACH resources can be partitioned by different CE levels. The UEs with similar CE requirements are scheduled within a same RAR message to reduce power consumption and resource overhead. The starting point of RAR message depends on PRACH transmission as well. Due to the repetition in transmission, the RAR monitoring window is extended in CE mode in one embodiment. In another embodiment, RAR monitoring window is same as legacy and defined as starting points to monitor RAR-DCI. Then, the RAR monitoring window doesn't comprise the duration of repeated transmission for RAR-DCI and/or RAR message, and the length of RAR monitoring window is the number of starting points for RAR-DCI monitoring.

For a small payload size, it's more efficient, from the view of resource overhead and power consumption, to transmit the small message by a control channel (like MPDCCH) instead of data channel (like PDSCH), considering different coding schemes for control channel and data channel. In one embodiment, two RAR modes are introduced. One is multiple RAR mode, and the other is single RAR mode. In multiple RAR mode, one or more UEs are multiplexed within one RAR message transmitted by PDSCH, which is scheduled by a multiple RAR-DCI. In single RAR mode, at least all content within a MAC RAR PDU is carried by a single RAR-DCI, wherein only one UE is carried by the single RAR message. Further, random access preamble identifier (RAPID) is also transmitted to confirm whether the received DCI is for the UE. The network can configure only one mode during a period or two modes at the same time. In a preferred embodiment, only one RAR mode within a cell works through a higher layer configuration. The DCI format and size are different for single RA mode and multiple RAR mode.

Considering the restriction to LC UEs, some contents within a RAR message can be modified. One consideration is the size of resource allocation within uplink (UL) grant, which is carried within RAR and used for Msg 3 transmission. In one embodiment, size of resource allocation varies according to UL system bandwidth to reduce overhead. In one option, the resource allocation field indicates which narrow band is used and the exact resource allocation within the narrow band. For LC MTC UEs, UL transmission is limited to one PRB pair to enhance SNR per subcarrier. Then, the possible size can be {5, 7, 8, 10} bits in one embodiment, wherein only one PRB pair within a narrow band is allocated for transmission.

Another consideration is TPC command within the UL grant. In a first embodiment, the TPC command is reused as the repetition number for Msg 3 in CE mode. Since UE can determine its CE level by measurement, the UE knows how to interpret this field. In a second embodiment, TPC command is not modified, and repetition number for Msg3 is derived from a specific repetition level corresponding to transmitted preamble, without introducing a new field to RAR message. In a third embodiment, TPC command is also used and additional field is introduced to indicate the repetition number for Msg 3 in CE mode.

Further, the Backoff Indicator (BI) value and transmission can be modified. In a first embodiment, BI is separated from MAC RAR header and transmitted by RAR-DCI always. In a second embodiment, BI is transmitted within PDSCH carrying other RAR content, and BI is transmitted within RAR-DCI if there is no UE to be responded by the network. In a third embodiment, BI is separated from MAC RAR header and configured semi-statically by higher layer, but not transmitted dynamically.

The value of BI can be also extended in CE mode due to a large number of repetitions, which will require more time to transmit a preamble again once there is no RAR for the previous transmitted preamble. In one embodiment, an extended BI value is obtained by multiplying a coefficient with an indicated normal BI value. In another embodiment, some new BI values are introduced for LC MTC UEs.

Obviously, RAR-DCI formats are different in single RAR mode and multiple RAR mode. To facilitate description, RAR-DCI for single RAR is named as single-RAR-DCI, and RAR-DCI for multiple RAR is named as multiple-RAR-DCI. Then, single-RAR-DCI comprises content within a MAC RAR, RAPID, and optionally BI.

FIG. 10 illustrates an exemplary diagram of the single-RAR-DCI for the single RAR mode in accordance with embodiments of the current invention. In this example for single-RAR-DCI, it's assumed that TPC command is reused for repetition number. Then, the RAR-DCI size is identical in both NC mode and CE mode. The UE can determine it is in CE mode or NC mode by measurement. The resource allocation (RA) field varies with the UL bandwidth, regardless of CE mode or NC mode. Accordingly, the size of MAC RAR PDU is {42, 44, 45, 47} bits under different RA sizes, as shown in FIG. 10, and the MAC RAR PDU comprises timing advance (TA), temporary C-RNTI and UL grant. Note that if an additional field for repetition number is introduced, the size of MAC RAR PDU will increase by 2 bits in one embodiment or 3 bits in another embodiment.

In this example, the single-RAR-DCI also comprises an BI 1001 with four bits, a RAPID 1002 with six bits.

In case of multiple RAR mode, multiple-RAR-DCI is used to schedule a RAR message for one or more UEs. Similar to Call-paging-DCI, the multiple-RAR-DCI could comprise MCS field and RA field at least. Further, a repetition number field is introduced to indicate the repetition number for RAR receiving in one embodiment. In another embodiment, the repetition number for RAR receiving is derived from a basic repetition number corresponding to a specific repetition level and the payload size/coding rate from MCS field.

Considering there may be no MAC RAR transmission, a flag within multiple-RAR-DCI is introduced whether there is MAC RAR PDU transmission. In one embodiment, BI value is transmitted within the multiple-RAR-DCI when there is no MAC RAR PDU. In another embodiment, BI value is transmitted with MAC RAR PDU if it exists and carried by PDSCH.

FIG. 11A illustrates an exemplary diagram of the multiple-RAR-DCI for the multiple RAR mode in accordance with embodiments of the current invention. In this example, the DCI size is the same for both NC mode and CE mode. The BI is transmitted within multiple-RAR-DCI if there is no MAC RAR PDU, otherwise, it is the first entry of the data packet by PDSCH carrying MAC RAR PDU. The multiple-RAR-DCI has flag 1101 with one bit, a MCS field 1102 with 4 or 5 bits, a RA field 1103 with the size choosing from {5-bit, 7-bit, 8-bit, 10-bit}, and a 2-bit repetition number field 1104.

FIG. 11B illustrates a table for different scenarios to interpret a multiple-RAR-DCI in accordance with embodiments of the current invention. In this example, if the 1-bit flag is zero, which indicates a scenario without MAC RAR PDU transmission, the multiple-RAR-DCI comprises the flag and the BI. That means that BI is transmitted within the multiple-RAR-DCI, and no change to the DCI size. Then, UEs only decode the multiple-RAR-DCI to obtain BI value, without decoding PDSCH. If the 1-bit flag is set to one, which indicates a scenario with MAC RAR PDU transmission, the BI is within the PDSCH carrying a RAR message. And the multiple-RAR-DCI under such scenario comprises the one-bit flag, MCS field, RA field and a repetition number in CE mode if DCI format and size are different for NC mode and CE mode.

Figure 12:
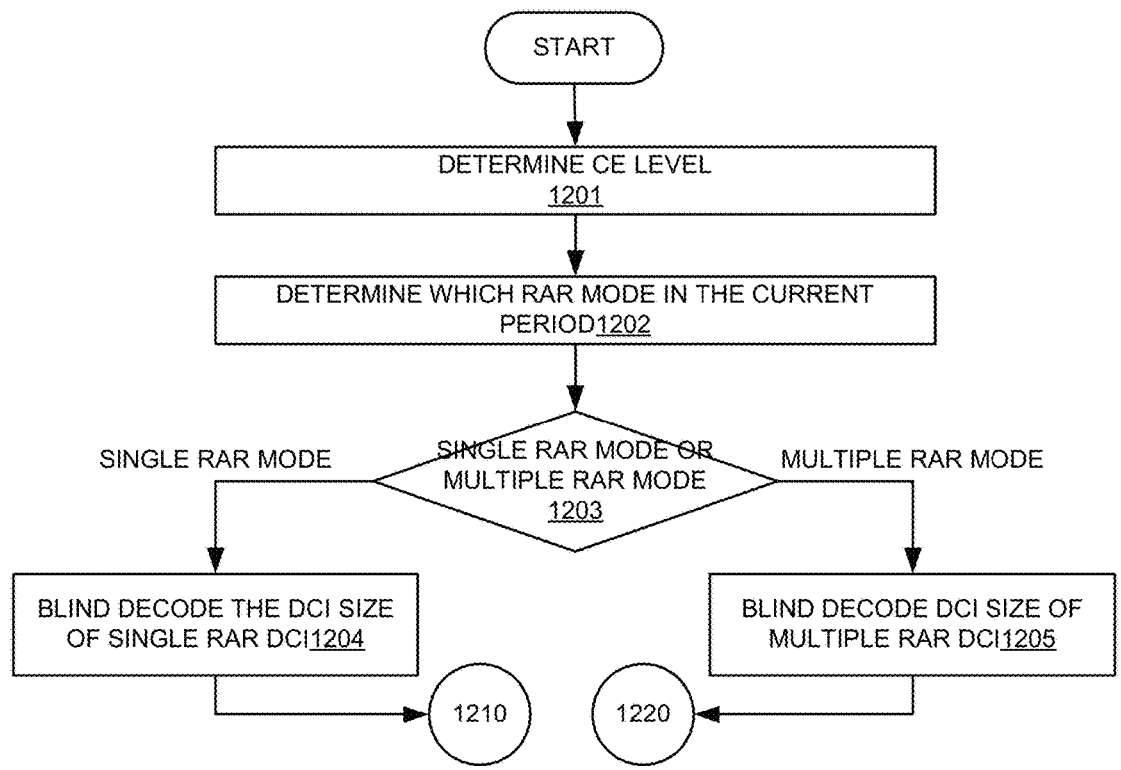
FIG. 12 shows an exemplary diagram for the first stage of procedure of RAR process for the single RAR or multiple RAR in accordance with embodiments of the current invention.

FIG. 12 shows an exemplary diagram for the first stage of procedure of RAR process for the single RAR or multiple RAR in accordance with embodiments of the current invention. Note that it's assumed that BI value is transmitted dynamically in the above examples, but not configured by higher layer semi-statically. At step 1201, the UE determines the CE level based on DL measurement. At step 1202, the UE determines the time position to monitor the RAR. At step 1203, the UE determines which RAR mode applies in the current period. If the single RAR mode is determined at step 1203, the UE blindly decodes the DCI size of the single-RAR-DCI at step 1204. The UE subsequently moves to step 1210 to handle RAR message in the single RAR mode. If a multiple-RAR-mode is determined at step 1203, the UE moves to step 1205 and blindly decodes DCI size of the multiple-RAR-DCI. The UE subsequently moves to step 1220 to handle the RAR message in the multiple RAR scenario.

Figure 13:
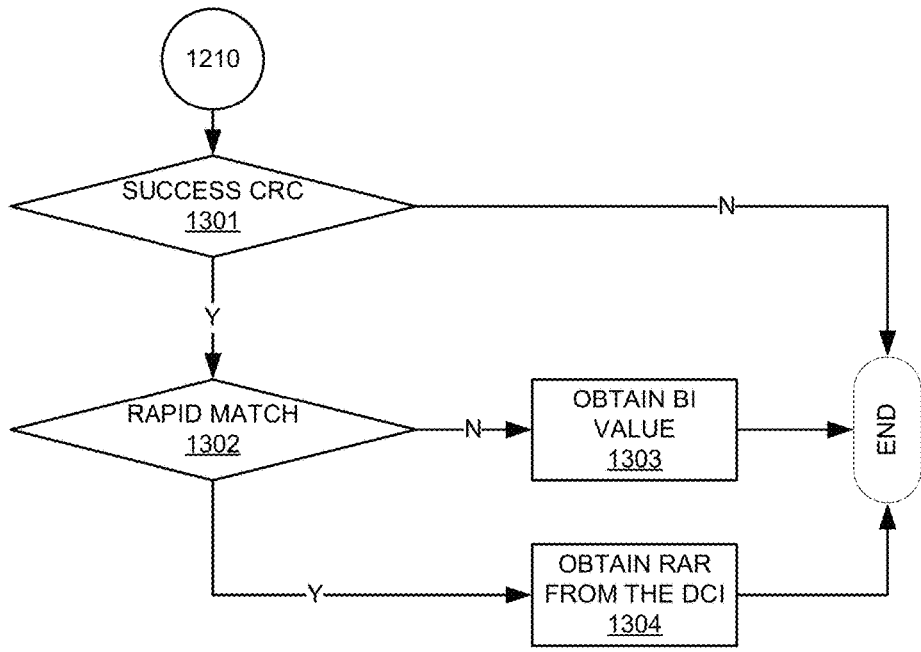
FIG. 13 shows an exemplary diagram for the second stage for the single RAR procedure in accordance with embodiments of the current invention.

FIG. 13 shows an exemplary diagram for the second stage for the single RAR procedure in accordance with embodiments of the current invention. At step 1301, the UE determines if blind decoding of the single-RAR-DCI is successful by CRC checking. If step 1301 determines no, the UE terminates the process, i.e., no control information carrying a MAC RAR PDU is transmitted. If step 1301 determines yes, the UE moves to step 1301 and checks if there is a RAPID match. If step 1302 determines no, the UE moves step 1303 and obtains the BI value from the decoded single-RAR-DCI. If step 1303 determines yes, the UE moves step 1304 and obtains the MAC RAR PDU from the decoded single-RAR-DCI.

Figure 14:
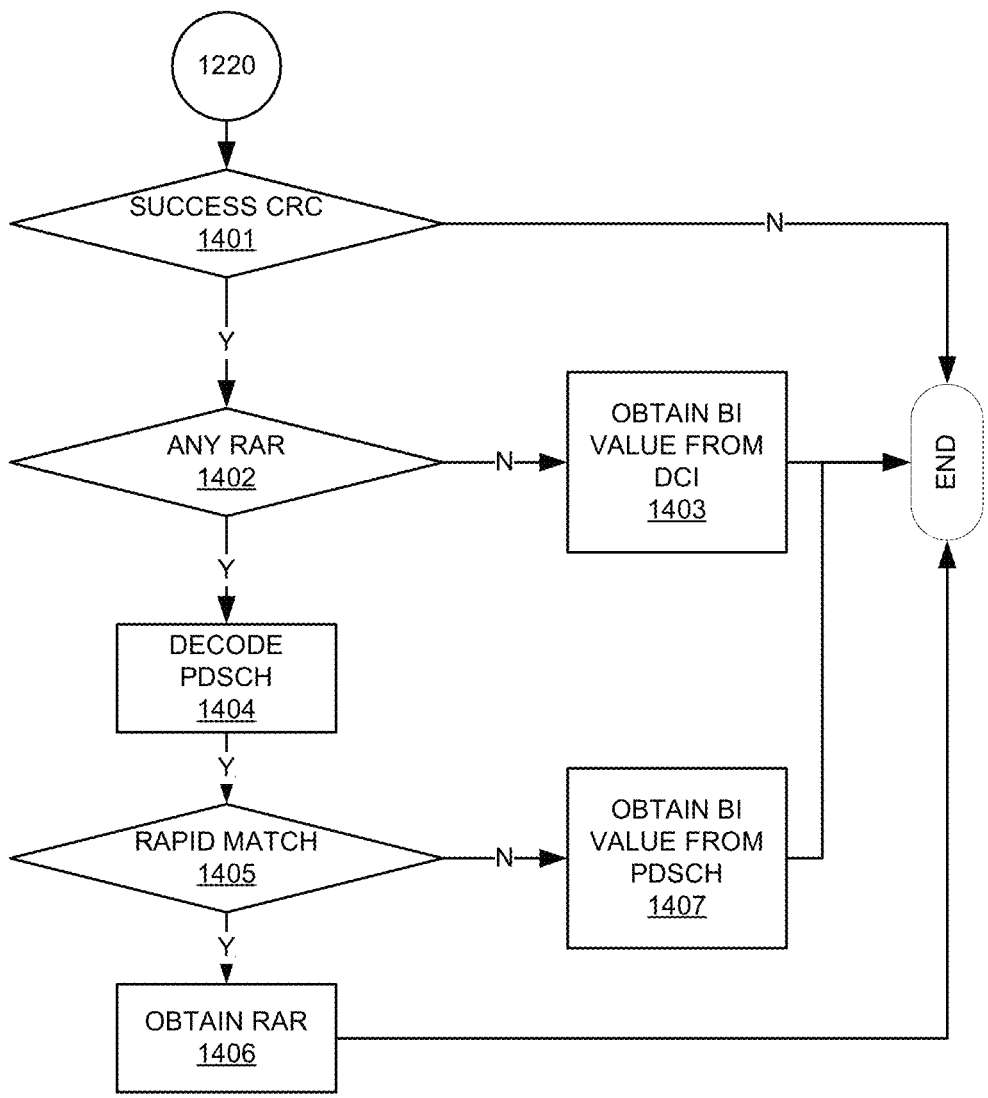
FIG. 14 shows an exemplary diagram for the second stage for the multiple RAR procedure in accordance with embodiments of the current invention.

FIG. 14 shows an exemplary diagram for the second stage for the multiple RAR procedure in accordance with embodiments of the current invention. At step 1401, the UE determines whether blind decoding of the multiple-RAR-DCI is successful by CRC checking. If step 1401 determines no, the UE terminates the process, i.e, the UE determines there is no control information scheduling a MAC RAR PDU from the determined time position. If step 1401 determines yes, the UE moves to step 1402 and determines if there is any RAR message by decoding the first flag field within the multiple-RAR-DCI. If step 1402 determines no, the UE moves to step 1403 and obtain the BI value from the decoded multiple-RAR-DCI. If step 1402 determines yes, the UE moves to step 1404 and decodes the PDSCH. At step 1405, the UE checks if there is a RAPID match. If step 1405 determines no, the UE obtains the BI value from the PDSCH at step 1407. If step 1405 determines yes, the UE obtains the RAR content at step 1406.

Figure 15:
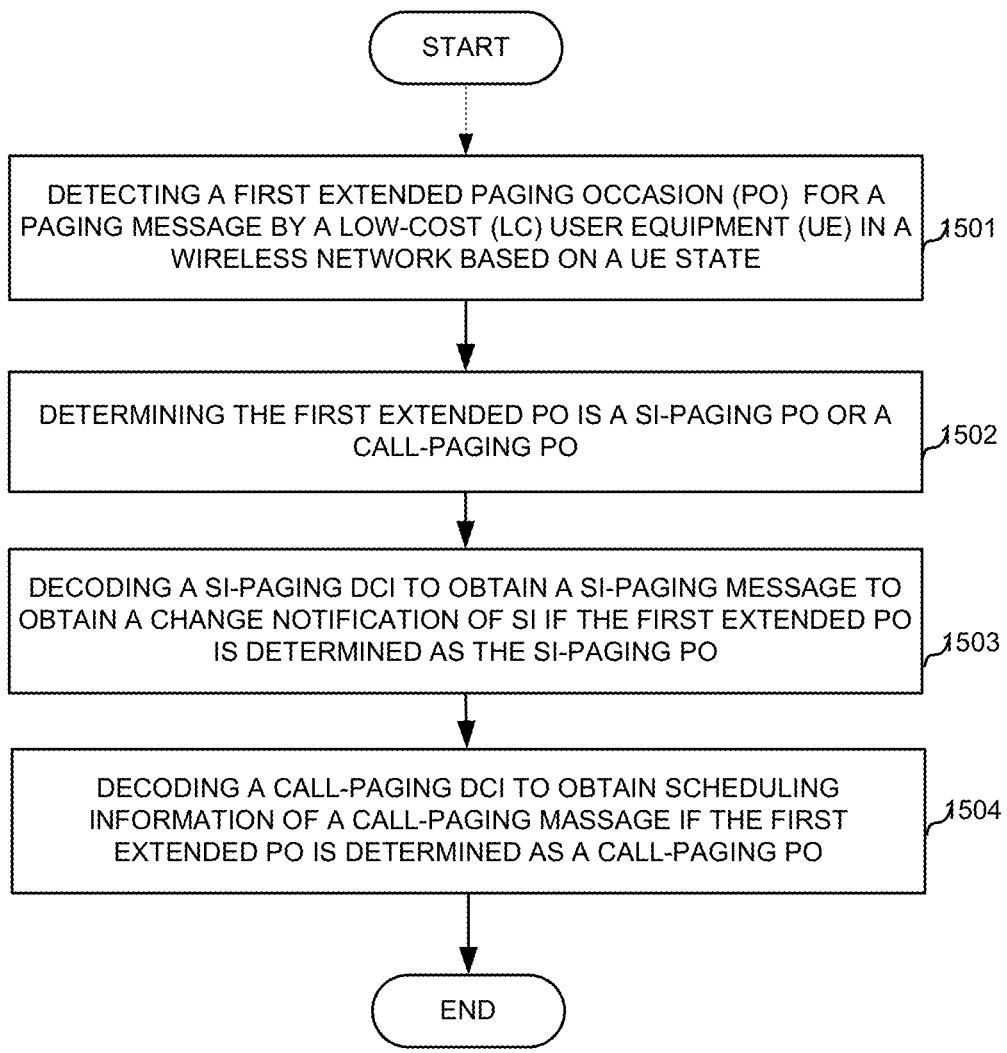
FIG. 15 illustrates an exemplary flow chart for paging scheduling and the DCI format by transmitting the SI-paging and the call-paging separately in accordance with embodiments of the current invention.

FIG. 15 illustrates an exemplary flow chart for paging scheduling and the DCI format by scheduling the SI-paging and the Call-paging separately in different extended POs in accordance with embodiments of the current invention. At step 1501, the UE detects a first extended PO for a paging message in a wireless network based on a UE state. At step 1502, the UE determines the first extended PO is a SI-paging PO or a Call-paging PO. At step 1503, the UE decodes a SI-paging DCI to obtain a SI-paging message to obtain a change notification of SI if the first extended PO is determined as the SI-paging PO. At step 1504, the UE decodes a call-paging DCI to obtain scheduling information of a call-paging massage if the first extended PO is determined as a call-paging PO.

Figure 16:
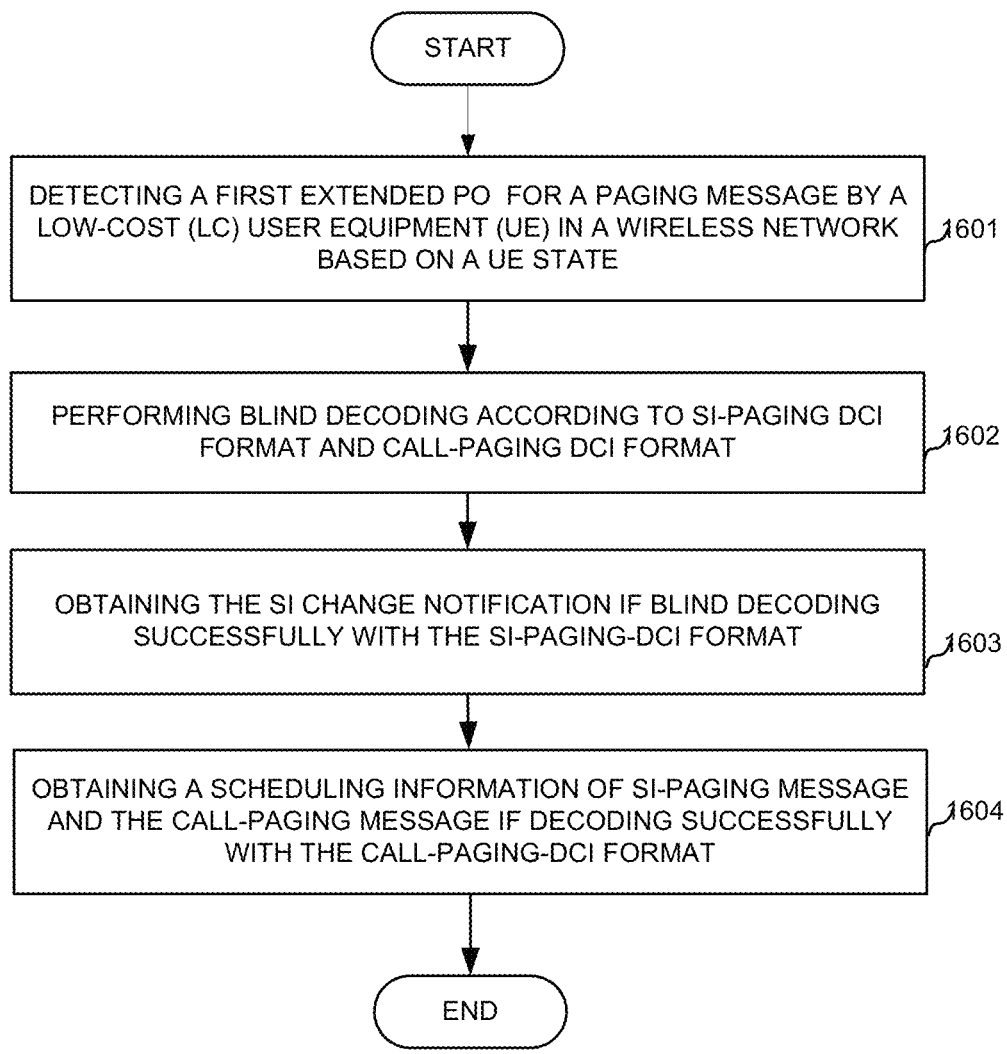
FIG. 16 illustrates an exemplary flow chart for paging scheduling and the DCI format by transmitting the SI-paging and the call-paging together in accordance with embodiments of the current invention.

FIG. 16 illustrates an exemplary flow chart for paging scheduling and the DCI format by scheduling the SI-paging and the Call-paging at a same time position in accordance with embodiments of the current invention. At step 1601, the UE detects a first extended PO for a paging message in a wireless network based on a UE state. At step 1602, the UE performs blind decoding according to SI-paging-DCI format and call-paging-DCI format. At step 1603, the UE obtains the SI change notification if blind decoding successfully with the SI-paging-DCI format. At step 1604, the UE obtains a scheduling information of SI-paging message and the call-paging message if decoding successfully with the call-paging-DCI format.

Figure 17:
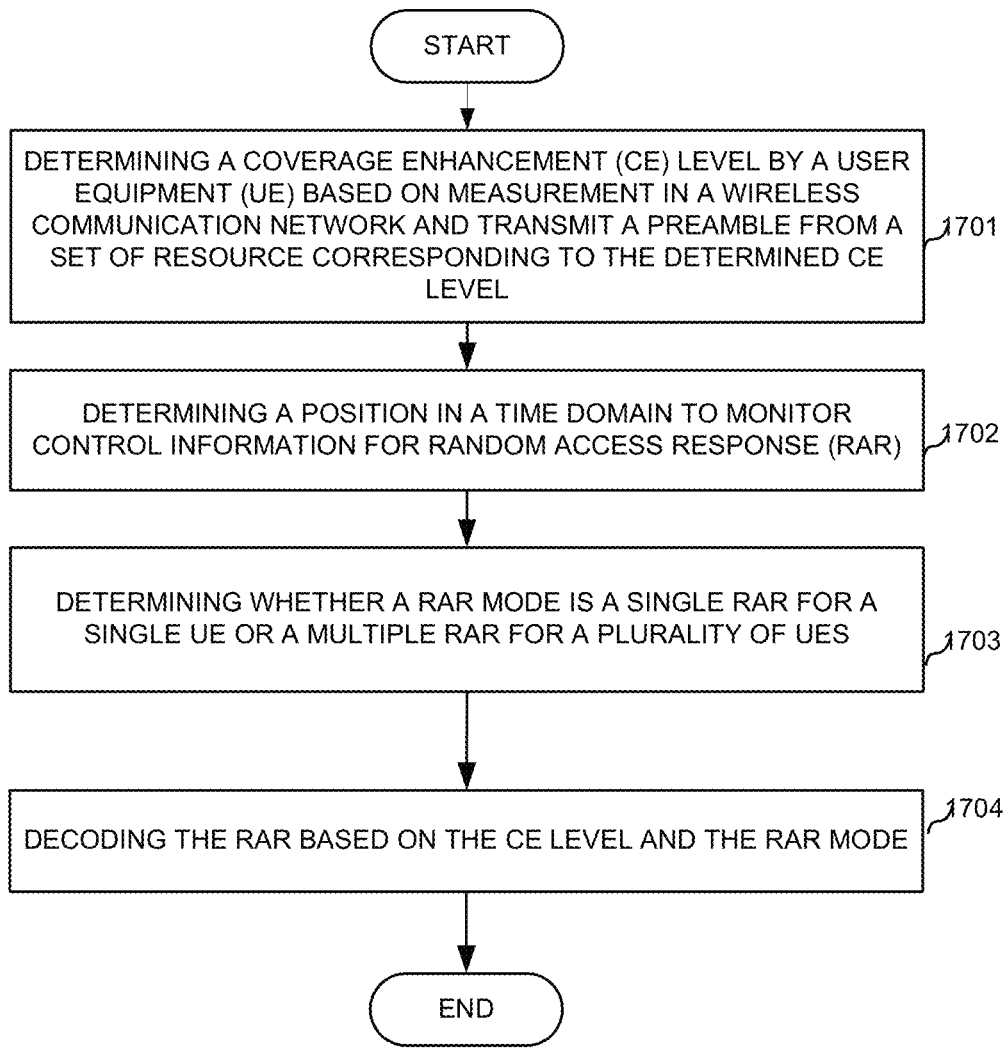
FIG. 17 illustrates an exemplary flow chart for RAR scheduling based on the CE level in accordance with embodiments of the current invention.

FIG. 17 illustrates an exemplary flow chart for RAR scheduling based on the CE level in accordance with embodiments of the current invention. At step 1701, the UE determines a coverage enhancement (CE) level based on measurement in a wireless communication network and transmit a preamble from a set of resources corresponding to the determined CE level. At step 1702, the UE determines a position in a time domain to monitor control information for RAR. At step 1703, the UE determines whether a RAR mode is a single RAR for a single UE or a multiple RAR for a plurality of UEs. At step 1704, the UE decodes the RAR based on the CE level and the RAR mode.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   detecting a first extended paging occasion (PO) for a paging message by a low-cost (LC) user equipment (UE) in a wireless network based on a UE state;
   determining the first extended PO is a SI-paging PO or a call-paging PO;
   decoding a SI-paging DCI to obtain a SI-paging message to obtain a change notification of SI if the first extended PO is determined as the SI-paging PO; and
   decoding a call-paging DCI to obtain scheduling information of a call-paging massage if the first extended PO is determined as a call-paging PO.

2. The method of claim 1, wherein the paging message is multi-casted to a plurality of UEs, and wherein the paging message carries a group identifier configured for the plurality of UEs.

3. The method of claim 2, wherein the group identifier is a logical UE ID.

4. The method of claim 2 wherein group identifier is group-specific paging radio network temporary identifier (P-RNTI).

5. The method of claim 2, wherein the plurality of UEs is configured with the same group identifier if the plurality of UEs have the same coverage enhancement (CE) level.

6. The method of claim 2, wherein the paging message sent repeatedly with a repetition number, and wherein the repetition number is determined by the maximum CE level of the plurality of UEs.

7. The method of claim 1, wherein the paging message is control information carrying the SI-Paging message or scheduling information for the call-Paging message.

8. The method of claim 1, wherein the SI-paging message comprises a value tag and a bitmap, wherein the value tag indicates whether any SI updates, and the bitmap indicates which one or more SIs update.

9. The method of claim 8, wherein a dedicated RNTI is allocated for the SI-paging-DCI.

10. The method of claim 1, wherein the call-paging DCI scheduled by a MTC physical downlink control channel (MPDCCH), and the call-paging message is carried by a physical downlink shared channel (PDSCH).

11. The method of claim 1, wherein a resource allocation indication is indicated in the call-paging DCI, wherein the resource allocation indication comprising at least one of the following: indicating a frequency location in a narrow band, or indicating the resource allocation within a known narrow band.

12. The method of claim 1, wherein an additional extended call-Paging PO is indicated by the call-paging-DCI.

13. A method, comprising:
    detecting a first extended PO for a paging message by a low-cost (LC) user equipment (UE) in a wireless network based on a UE state;
    perform blind decoding according to SI-paging-DCI format and call-paging DCI format;
    obtaining a SI change notification if blind decoding successfully with the SI-paging-DCI format;
    obtaining a scheduling information of SI-paging message and call-paging message if decoding successfully with call-paging-DCI format.

14. The method of claim 13, the paging message is the SI-Paging-DCI or control information scheduling both SI-Paging and call-Paging.

15. A method, comprising:
    determining a coverage enhancement (CE) level by a user equipment (UE) based on measurement in a wireless communication network;
    determining a position in a time domain to monitor control information for random access response (RAR);
    determining whether a RAR mode is a single RAR for a single UE or a multiple RAR for a plurality of UEs; and
    decoding the RAR based on the CE level and the RAR mode.

16. The method of claim 15, wherein a RAR-DCI has the same size for both enhanced coverage (CE) mode and normal coverage (NC).

17. The method of claim 15, wherein a transmit power control (TPC) command field is overloaded with a repetition number if the CE level indicates an enhanced coverage (CE) mode, wherein the repetition number indicates a number of repeated transmissions configured for the CE level to transmit Msg 3.

18. The method of claim 15, wherein a backoff indicator (BI) is not transmitted within the RAR or a RAR-DCI, but configured by a higher layer.

19. The method of claim 15, wherein a BI is within RAR-DCI if there is no RAR transmitted, otherwise, the BI is within RAR carried by PDSCH.

20. The method of claim 15 wherein a BI is transmitted within a RAR-DCI.

* * * * *